US010962204B2

(12) United States Patent
Esteves et al.

(10) Patent No.: US 10,962,204 B2
(45) Date of Patent: *Mar. 30, 2021

(54) ROTATIONAL COUPLERS FOR LIGHT FIXTURES

(71) Applicant: AXIS LIGHTING INC., Lasalle (CA)

(72) Inventors: Joseph Esteves, Lasalle (CA); Andrew Miles, Lasalle (CA); Howard Yaphe, Lasalle (CA); Thomas James, Lasalle (CA)

(73) Assignee: Axis Lighting Inc., LaSalle (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,581

(22) Filed: May 26, 2020

(65) Prior Publication Data

US 2020/0284408 A1    Sep. 10, 2020

Related U.S. Application Data

(63) Continuation of application No. 16/105,668, filed on Aug. 20, 2018, now Pat. No. 10,677,427, which is a
(Continued)

(51) Int. Cl.
*F21V 19/00* (2006.01)
*F21V 21/005* (2006.01)
(Continued)

(52) U.S. Cl.
CPC ............. *F21V 21/005* (2013.01); *F16B 7/20* (2013.01); *F16B 7/00* (2013.01); *F16B 7/182* (2013.01);
(Continued)

(58) Field of Classification Search
CPC .......... F21V 21/005; F21V 21/04; F16B 7/20; F16B 7/00; F16B 7/182; F21Y 2115/10
(Continued)

(56) References Cited

U.S. PATENT DOCUMENTS

D272,392 S    1/1984 Bigelow
4,778,252 A    10/1988 Filho
(Continued)

*Primary Examiner* — Ali Alavi
(74) *Attorney, Agent, or Firm* — Barnes & Thornburg LLP

(57) ABSTRACT

Disclosed is a coupling assembly for joining together a pair of light fixture segments at a joint interface therebetween to form a light fixture assembly, comprising a body rotatably mountable on a first of the light fixture segments about a central axis, the body configured to operably engage a drive tool with a drive axis thereof aligned with the central axis to rotate the body between a release position and a coupling position, the body having a designated receiving location to receive a complementary coupling element on a second of the light fixture segments, and configured to provide an arcuate pathway extending from designated receiving location, wherein the designated receiving location and pathway are configured to permit the complementary coupling element to travel along the pathway as the body rotates on the central axis, and thereby to laterally transfer the complementary coupling element radially toward the central axis to draw the first and second light fixture segment toward forming the joint interface when the body reaches the coupling position corresponding to the complementary coupling element reaching a corresponding position along the pathway.

13 Claims, 5 Drawing Sheets

Related U.S. Application Data continuation of application No. 15/603,070, filed on May 23, 2017, now Pat. No. 10,066,812.

(51) Int. Cl.
  *F16B 7/20* (2006.01)
  *F21Y 115/10* (2016.01)
  *F16B 7/18* (2006.01)
  *F16B 21/04* (2006.01)
  *F21S 4/28* (2016.01)
  *F16B 7/00* (2006.01)

(52) U.S. Cl.
  CPC ............. *F16B 21/04* (2013.01); *F21S 4/28* (2016.01); *F21Y 2115/10* (2016.08)

(58) Field of Classification Search
  USPC ........................................................ 362/382
  See application file for complete search history.

(56) References Cited

U.S. PATENT DOCUMENTS

| | | |
|---|---|---|
| D327,111 S | 6/1992 | Hemming |
| D335,441 S | 5/1993 | Fraker |
| D486,602 S | 2/2004 | Hines |
| 6,929,226 B1 | 8/2005 | Philistine |
| D510,017 S | 9/2005 | Messina |
| D513,264 S | 12/2005 | Hayashi |
| D514,612 S | 2/2006 | Boele |
| D557,574 S | 12/2007 | Hein |
| 7,722,230 B2 | 5/2010 | Chien |
| D638,572 S | 5/2011 | Lee |
| 7,985,005 B2 | 7/2011 | Alexander |
| D687,702 S | 8/2013 | Yates |
| 9,183,975 B2 | 11/2015 | Aigner |
| 9,618,172 B1 | 4/2017 | Means, III |
| D791,395 S | 7/2017 | Rashidi |
| D799,935 S | 10/2017 | Rashidi |
| 9,867,454 B2 | 1/2018 | Castro |
| D817,753 S | 5/2018 | Pedley |
| 10,066,812 B1 * | 9/2018 | Esteves ............... F16B 7/20 |
| 10,677,427 B2 * | 6/2020 | Esteves ............. F21V 21/005 |
| 2005/0254263 A1 | 11/2005 | Harwood |
| 2011/0163341 A1 | 7/2011 | Van Elmpt |
| 2013/0111711 A1 | 5/2013 | Haase |
| 2016/0039596 A1 | 2/2016 | Nelson |
| 2016/0102724 A1 | 4/2016 | Potter |
| 2017/0211762 A1 | 7/2017 | Thomas |
| 2018/0252393 A1 | 9/2018 | Layne |

* cited by examiner

ROTATIONAL COUPLERS FOR LIGHT FIXTURES

CROSS REFERENCE TO RELATED APPLICATIONS

This application is a Continuation of copending U.S. application Ser. No. 16/105,668, filed Aug. 20, 2018, which is a Continuation of U.S. application Ser. No. 15/603,070, filed May 23, 2017 (now U.S. Pat. No. 10,066,812). The disclosures set forth in the referenced applications are incorporated herein by reference in their entirety.

FIELD OF THE DISCLOSURE

The present disclosure relates to light fixtures and other wall or ceiling mountable articles and, for example, to methods and devices for coupling adjacent units thereof in a light fixture installation.

BACKGROUND

Linear light fixtures are typically formed from aligned housings which are fastened together with coupling interfaces between them. With the advances in both technology and price, LED's are housed in structures that are decreasing in size allowing designers to achieve new optical effects at relatively smaller scale. Some couplers make use of threaded members to displace a linkage to draw adjacent segments of a light fixture together. While such couplers are currently deployed in an effective manner, the use of the fastener to displace the linkage can present disadvantages, since it can require many full rotations of the fastener to complete the coupling.

It would thus be desirable to provide alternative approaches for joint interfaces.

SUMMARY

In an aspect, there is provided a coupling assembly for joining together a pair of light fixture segments at a joint interface therebetween to form a light fixture assembly, comprising a body rotatably mountable on a first of the light fixture segments about a central axis, the body configured to operably engage a drive tool with a drive axis thereof aligned with the central axis to rotate the body between a release position and a coupling position. The body has an opening to receive a complementary coupling element on a second of the light fixture segments. An arcuate pathway extends from opening, wherein the opening is configured to permit the complementary coupling element to enter the pathway and to travel along the pathway, and wherein the pathway is configured to laterally transfer the complementary coupling element toward the central axis and thereby draw the first and second light fixture segment toward forming the joint interface when the body reaches the coupling position corresponding to the complementary coupling element reaching a corresponding position along the pathway.

In another aspect, there is provided a coupling assembly for joining together a pair of light fixture segments at a joint interface therebetween to form a light fixture assembly. The coupling assembly comprises a body rotatably mountable on a first of the light fixture segments about a central axis. The body is configured to operably engage a drive tool with a drive axis thereof aligned with the central axis to rotate the body between a release position and a coupling position. The body has a designated receiving location to receive a complementary coupling element on a second of the light fixture segments, and is configured to provide an arcuate pathway extending from designated receiving location. The designated receiving location and pathway are configured to permit the complementary coupling element to travel along the pathway as the body rotates on the central axis, and thereby to laterally transfer the complementary coupling element radially toward the central axis to draw the first and second light fixture segments toward forming the joint interface when the body reaches the coupling position when the complementary coupling element reaches a corresponding position along the pathway.

In some exemplary embodiments, the designated receiving location includes an opening formed in the body.

In some exemplary embodiments, the arcuate pathway may be provided as a slot extending from the opening.

In some exemplary embodiments, the opening may be at a first radial distance from the central axis and the slot includes a terminus positioned at a second radial distance from the central axis, wherein the first distance is greater than the second distance.

Some exemplary embodiments may further comprise a mounting unit configured to be installed on the first light fixture segment, wherein the body is rotatably mounted on the mounting unit.

In some exemplary embodiments, the body may be provided with a central hub portion with a central passage extending therethrough, the hub portion having a drive tool engaging structure.

In some exemplary embodiments, the central passage in the tool engaging structure may be configured at a first end to form a drive tool receiving cavity.

In some exemplary embodiments, the central passage may be configured at a second end to receive a threaded fastener to rotatably mount the hub portion to the mounting unit.

Some exemplary embodiments may further comprise a web portion extending radially outwardly from and at least partially extending around the hub portion, the web having a peripheral region with a discontinuity formed therein to define the opening.

In some exemplary embodiments, the web portion may be disc-shaped with an enlarged outer rim and a pair of opposite surfaces, and the pathway extends from the opening and is open to both opposite surfaces to form the slot in the web portion.

In some exemplary embodiments, the mounting unit may be elongate and configured to be mountable along a corresponding one of a pair pathways formed in respective end regions of each of the first and second light fixture segments to be adjacent the joint interface.

In some exemplary embodiments, the mounting unit may be provided with a first end region which is configured to receive the body rotatably mounted thereon for use in a first mode to be mounted in the first light fixture segment, and a second end region with a formation extending outwardly therefrom for use in a second mode to be mounted in the second light figure segment with the formation to serve as the complementary coupling element.

In some exemplary embodiments, the formation may be a post extending upwardly from the mounting unit with a diameter which is smaller than a width of the pathway.

In some exemplary embodiments, the pathway may include a plurality of serrations along at least one boundary thereof to engage the complementary coupling unit to cause an progressively indexing effect between the body and the complementary coupling unit as the complementary coupling unit progresses along the at least one boundary during travel along the pathway.

In another aspect, there is provided a method of assembling together a pair of light fixture segments at a joint interface therebetween to form a light fixture assembly using an assembly according to any exemplary embodiment or aspect described in the present disclosure and claims, comprising:
   a. providing a pair of light fixture segments;
   b. rotatably mounting the body of any exemplary embodiment or aspect described in the present disclosure and claims, on a first of the light fixture segments;
   c. providing the complementary coupling element of any exemplary embodiment or aspect described in the present disclosure and claims, on a second of the light fixture segments;
   d. positioning the complementary coupling element adjacent the designated receiving location in the release position; and
   e. engaging a drive tool with the body thereof aligned with a central axis of the body to rotate the body from the release position to the coupling position, with the complementary coupling element displaced along the pathway.

In another aspect, there is provided a kit comprising the assembly according to any exemplary embodiment or aspect described in the present disclosure and claims.

In another aspect, there is provided a light fixture segment comprising the body according to any exemplary embodiment or aspect described in the present disclosure and claims.

BRIEF DESCRIPTION OF THE FIGURES

Several exemplary embodiments of the present disclosure will be provided, by way of examples only, with reference to the appended drawings, wherein.

DETAILED DESCRIPTION

Figure 1:
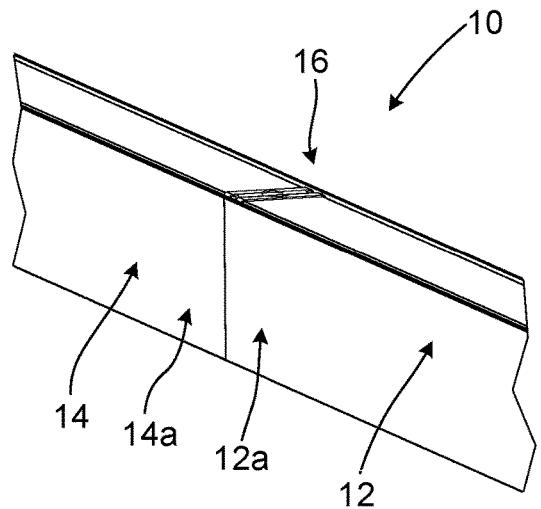
FIG. 1 is a perspective view of a portion of a light fixture assembly.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or other connections or couplings. The terms upper, lower, and vertical are intended for operative context only and are not necessarily intended to limit the invention only to those configurations or orientations. Furthermore, and as described in subsequent paragraphs, the specific mechanical and/or other configurations illustrated in the drawings are intended to exemplify embodiments of the invention. However, other alternative mechanical and/or other configurations are possible which are considered to be within the teachings of the instant disclosure.

Figure 2:
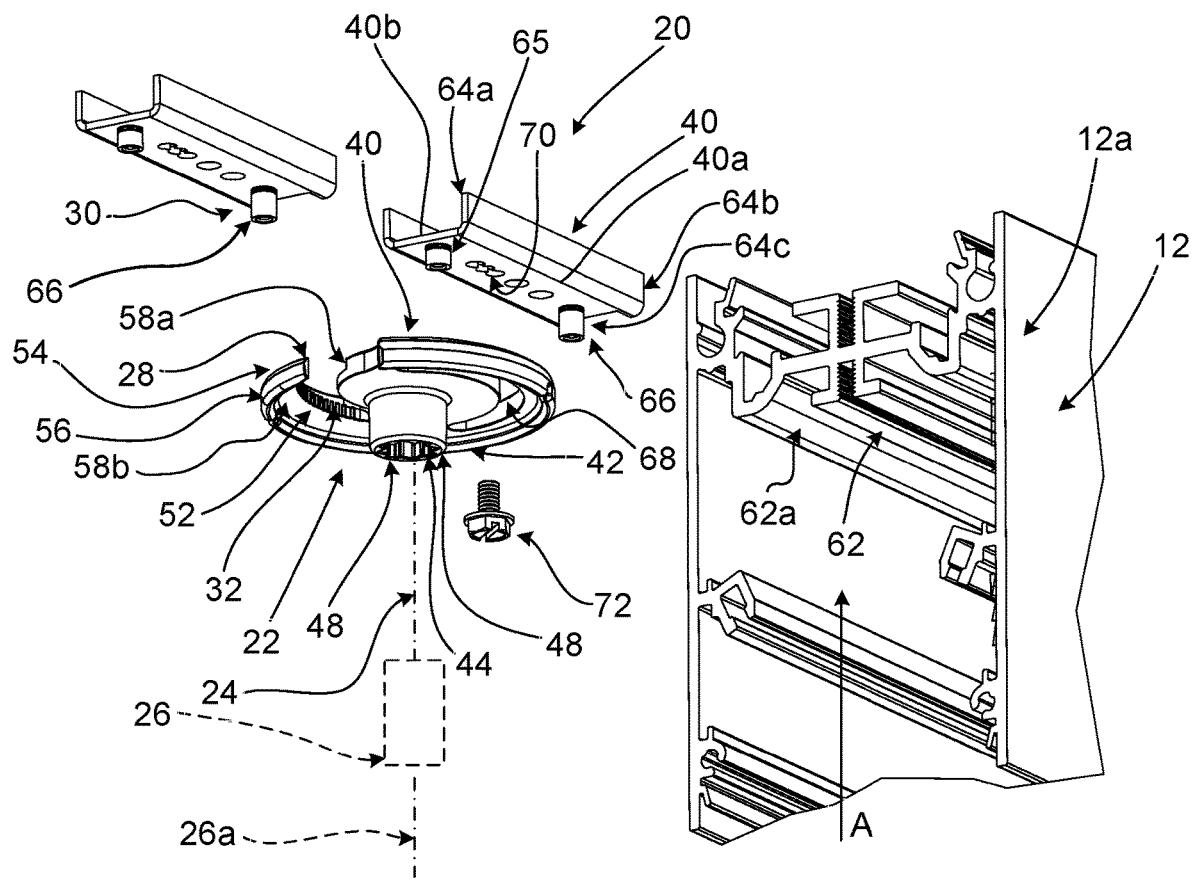
FIG. 2 is a fragmentary exploded perspective view of a portion of the assembly of FIG. 1.

FIG. 1 shows a partial perspective assembly view of a light fixture assembly 10 having a plurality (in this example a pair) of light fixture segments 12, 14 with respective end regions 12a, 14a, with end region 12a being seen in FIG. 2. The end regions are configured to be assembled together at a joint interface 16.

Figure 3:
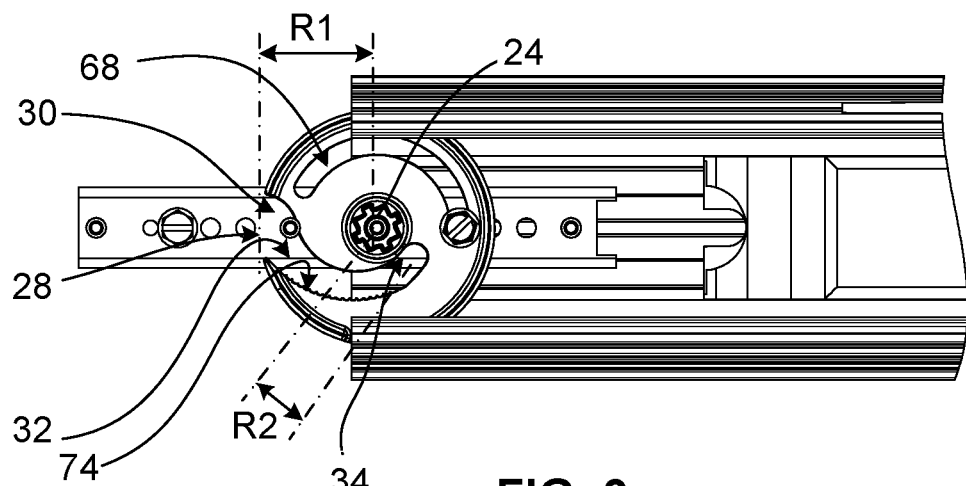
FIGS. 3 to 5 are plan views of the assembly taken on arrow A of FIG. 2.
Figure 5:
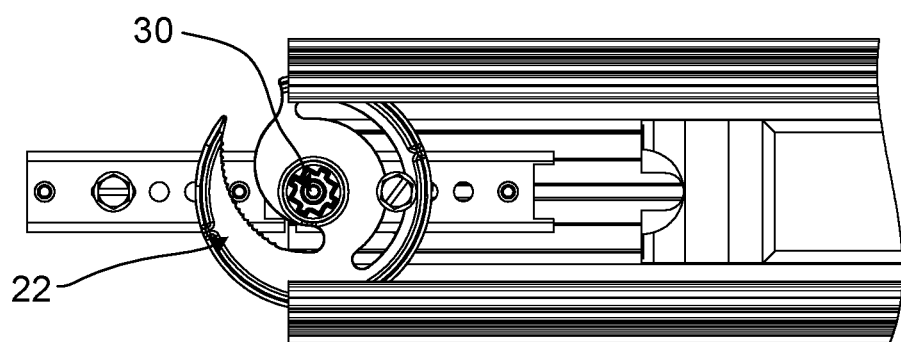
Figure 6:
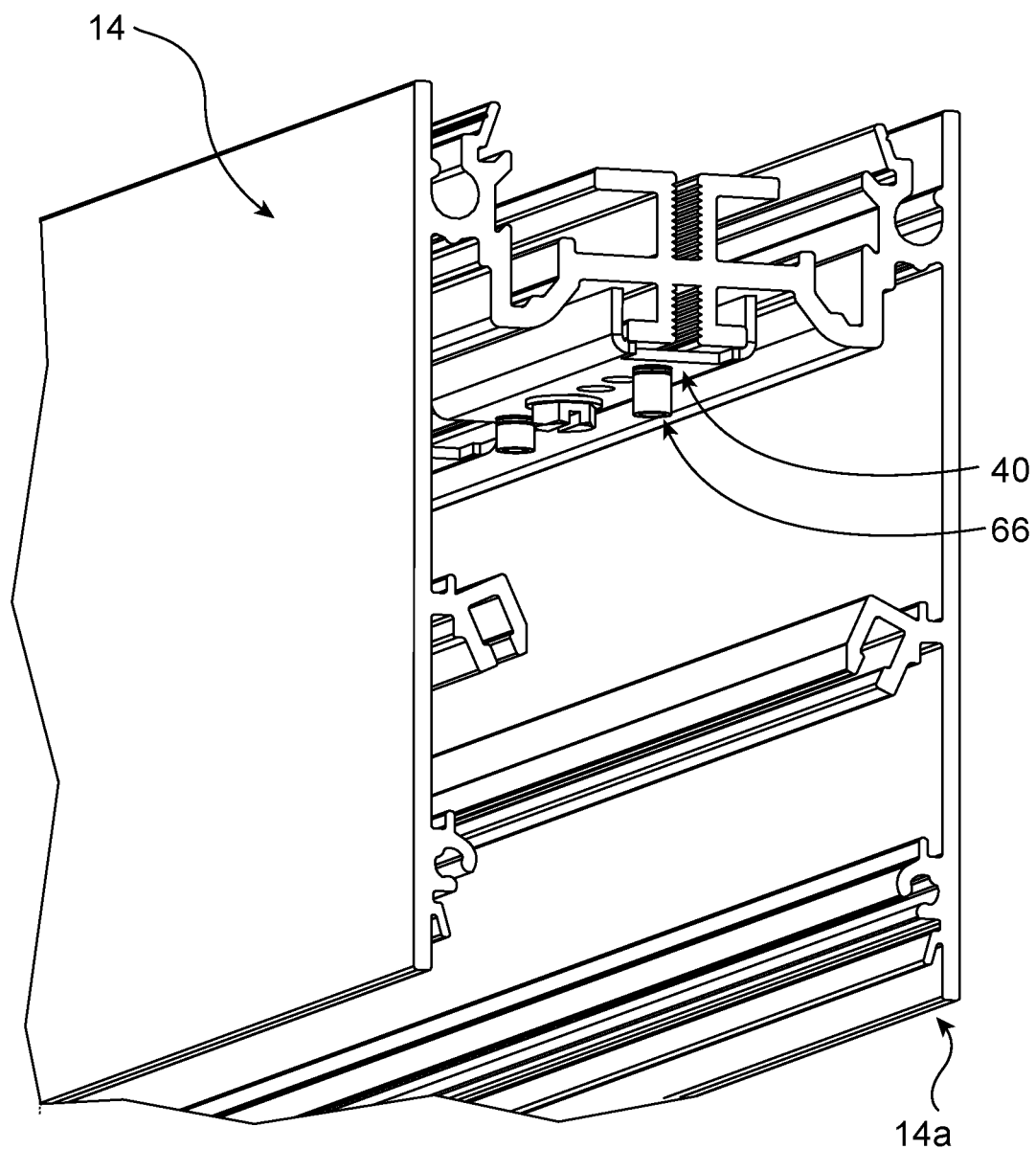
FIG. 6 is a fragmentary perspective view of another portion of the assembly of FIG. 1.
Figure 7:
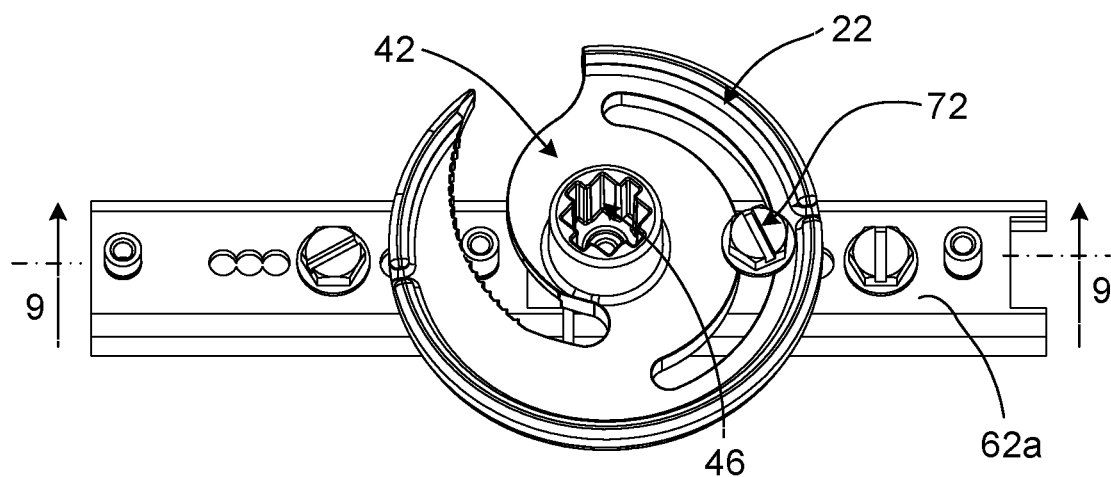
FIGS. 7 and 8 are perspective views of another portion of the assembly of FIG. 1.
Figure 8:
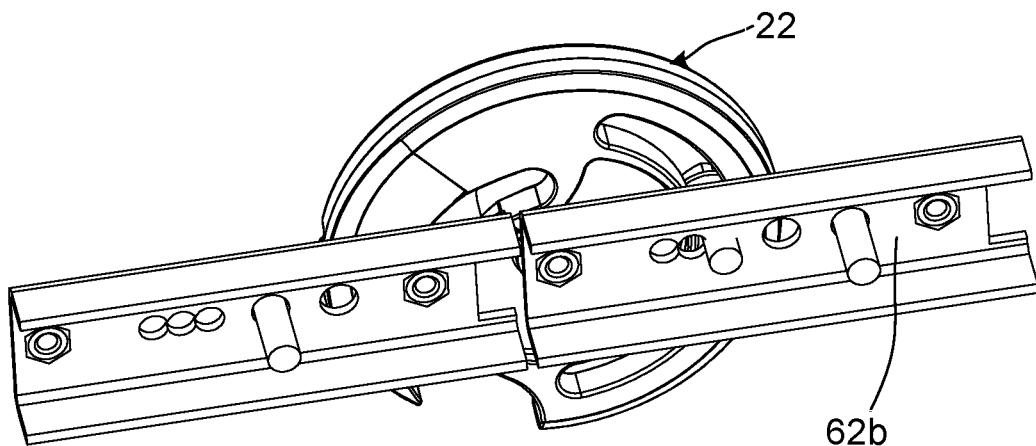
Figure 9:
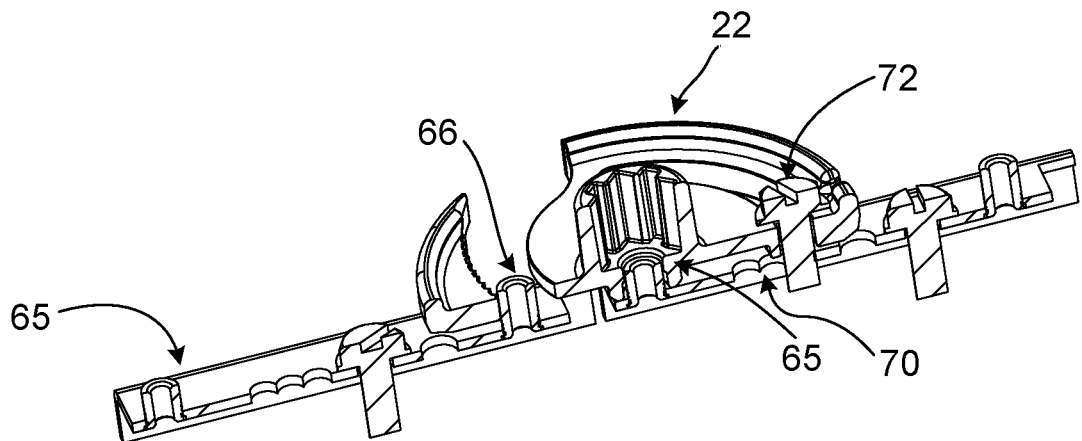
FIG. 9 is a sectional perspective view taken on line 9 of FIG. 7.
Figure 10:
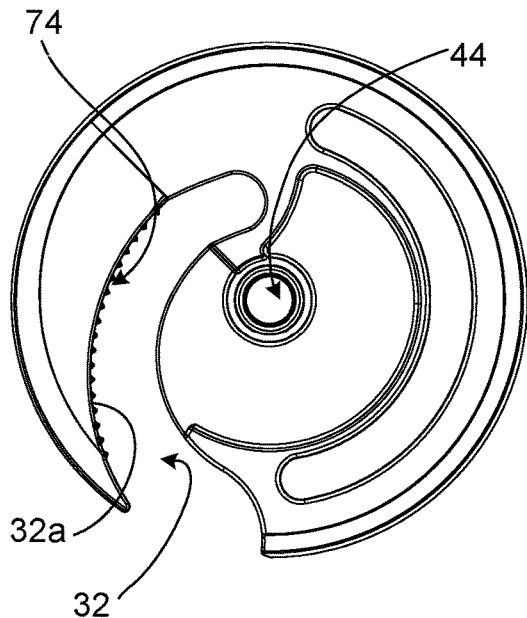
FIGS. 10 to 14 are plan, perspective or side views of a component shown in FIGS. 7 to 9.
Figure 13:
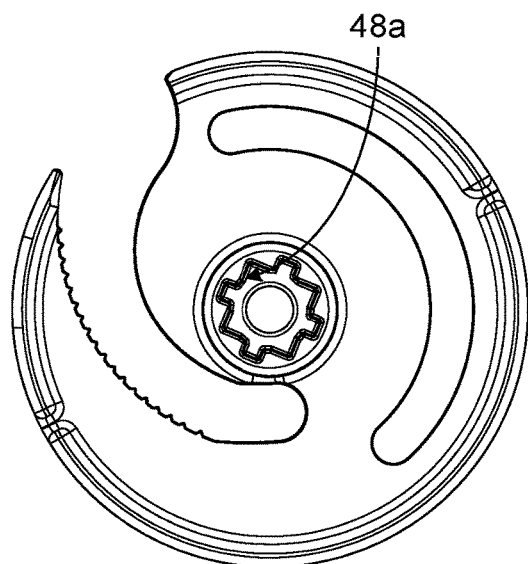
Figure 11:
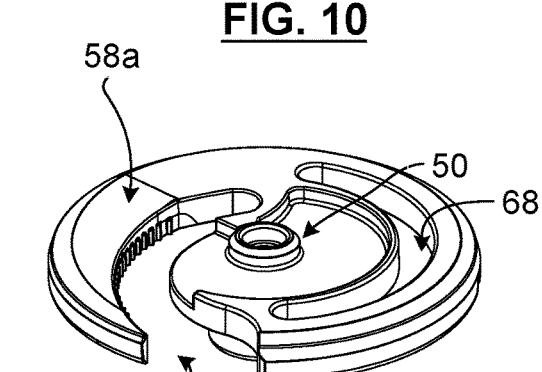
Figure 12:
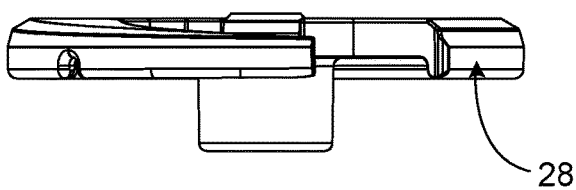
Figure 14:
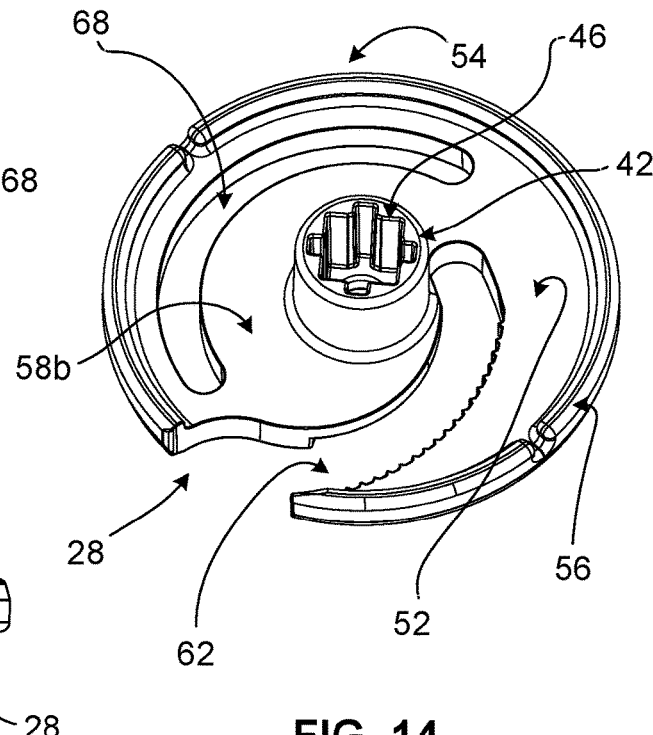

FIG. 2 shows a coupling assembly 20 for joining together the light fixture segments 12, 14 at the joint interface 16, comprising a body 22 rotatably mountable on the light fixture segment 12 about a central axis 24. The body 22 is configured to operably engage a drive tool shown schematically at 26 with a drive axis 26a thereof aligned with the central axis 24 to rotate the body 22 between a release position and a coupling position, as seen in FIGS. 3 and 5 respectively, as will be described.

The body has an opening 28 to receive a complementary coupling element 30 positioned on the light fixture segment 14, as will be described. A first arcuate pathway 32 extends between the opening 28 and a terminus, shown at 34 in FIG. 3, wherein the opening 28 is configured to permit the complementary coupling element 30 to enter the pathway 32 and to travel along the pathway 32 toward the terminus 34. The pathway 32 is further configured to laterally transfer the complementary coupling element 30 toward the central axis 24 and thereby draw the first and second light fixture segment 12, 14 toward forming the joint interface 16 when the body 22 reaches the coupling position (FIG. 5) corresponding to the complementary coupling element 30 reaching a corresponding position along the pathway and toward the terminus.

In this case, the complementary coupling unit 30 need not reach the terminus 34 but instead reach a position between the opening 28 and the terminus 34 corresponding to a displacement of the complementary coupling unit 30 a distance toward the central axis sufficient to take up the spacing between the first and second segments 12, 14 to form the joint interface 16.

In this case, the joint interface 16 forms a connection between the segments 12, 14. The segments 12, 14 may be pre-assembled as operable light fixture units, per se, so that they may be operably interconnected across or over the joint interface 16 to complete the light fixture assembly 10, such as by connecting power lines between drivers and/or light emitting arrays therein, or optics such as lenses or the like.

Referring to FIG. 3, the opening 28 is at a first radial distance R1 from the central axis 24, while the terminus 34 is at a second radial distance R2 from the central axis 24, wherein the first radial distance R1 is greater than the second radial distance R2, so that when the body 22 is rotated about the central axis 24 the complementary coupling unit 30 is drawn toward the central axis 24.

As shown in FIG. 2, also provided is a mounting unit 40 which is configured to be installed on the light fixture segment 12, wherein the body 22 is rotatably mounted on the mounting unit 40, as will be described. The mounting unit 40 may also be configured to also provide a mounting location for the corresponding coupling unit 30 so that the mounting unit 40 may be used in two mounting modes, as will be described.

In some exemplary embodiments as shown in FIGS. 2 and 7 to 14, the body 22 may be provided with a central hub portion 42 with a central passage 44 extending therethrough, and a drive tool engaging structure 46. The central passage 44 extends through the tool engaging structure 46 and is configured at a first end 48 to form a drive tool receiving cavity 48a. The central passage 44 is also configured at a second end 50 to receive a threaded fastener to rotatably mount the hub portion 42 to the mounting unit 40. In this instance, the threaded fastener (not shown) may extend through the second end 50 after being inserted through the drive tool receiving cavity 48.

In some exemplary embodiments, a web portion 52 may extend radially outwardly from and at least partially extend around the hub portion 42. The web portion 52 has a peripheral region 54 with a discontinuity formed therein to define the opening 28.

The web portion 52 may be provided in a disc-shaped configuration with an enlarged outer rim 56 and a pair of opposite surfaces. In this case, the pathway may extend from the opening 28 and be exposed to both opposite surfaces 58a, 58b to form an open groove (or slot) in the web portion 52.

While the body 22 is provided in a disc-shaped configuration with opening 28, the body may be provided in other configurations without the opening. For instance, the body may be provided as an arcuate brace structure which extends from the central hub to provide the arcuate surface, such as surface 32a bordering pathway 32, and thus without an opening of the type seen at 28.

In some exemplary embodiments, the mounting unit 40 may be elongate and configured to be mountable along a mounting region 62 formed in respective end regions 12a, 14a of each of the light fixture segments 12, 14 to be adjacent the joint interface 16. In this case, the mounting unit 40 may be provided with a first surface 40a to receive the post 66 thereon and a second surface 40b to be complementary with a corresponding surface 62a on the mounting region 62. Therefore, the joint interface 16 may be formed with the body 22 and the complementary coupling unit 30 by way of two of the mounting units 40, wherein one is in a first mode to mount the body 22 to the light fixture segment 12 and a second mode to mount the complementary coupling unit 30 to the light fixture segment 14.

In some exemplary embodiments, the mounting unit 40 may be provided with a first end region 64a which is configured to receive the body 12 rotatably mounted thereon (by way of an internally threaded post 65 to receive a threaded fastener extending through the second end 50 of the central passage 44) for use in a first mode to be mounted in the light fixture segment 12, and a second end region 64b with a formation 64c extending outwardly therefrom.

The formation 64c may be provided as a post 66 extending upwardly from the mounting unit and may be used in a second mode to be mounted in the second light figure segment with the formation to serve as the complementary coupling element 30, so that the same post 66 may perform the role of the component element 30. Meanwhile, the body includes a second arcuate pathway 68 which, in this case, may be provided as a slot which extends along the web portion with a relatively equal radial distance from the central axis 24. The mounting unit 40 may also be provided with one or more passages shown at 70, in which one may receive a locking fastener 72 extending through the second pathway 66 and lock to fix the body 22 in the coupling position. (In this case, the multiple passages 70 may allow the mounting unit 40 to be used with differently sized bodies 22).

In some exemplary embodiments, the pathway may include a plurality is serrations 74 (as seen in FIG. 3) along at least one boundary (in this case the surface 32a) thereof to engage the post 66 to cause an progressively indexing effect between the body 22 and the post as the post progresses along the boundary during travel along the pathway toward the terminus. If desired, the post 66 may also be internally threaded to receive a fastener, not shown, to fix the position of the post 66 relative to the body 20.

Figure 4:
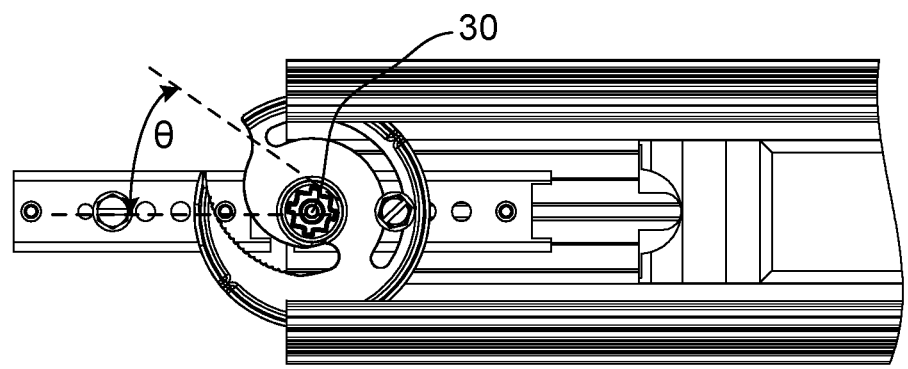

The light fixture assembly 10 may thus be assembled as follows. First, the light fixture segments 12 and 14 may be prepared with a mounting unit 40 installed in each mounting region 62. In the case of fixture segment 12, the body 22 may be mounted on the internally threaded post 65 by way of a threaded fastener and locking fastener 72 extending through the second pathway 68 and loosely threaded into one of the locking passages 70. Thus, with each fixture segment so prepared, the end regions 12a and 14a may be aligned with the body 22, in end region 12a, oriented with the opening 28 open to receive the post 66, in end region 14a. Next, the drive tool 26 may be engaged with the cavity 48a to rotate the body 22, through an angle of rotation θ (as shown in FIG. 4) to cause the post 66 to move relative to the body 22 along the outer boundary (surface 32a) of the first pathway 32, eventually engaging the serrations 74 and the resulting index effect thereof. Rotating the body 22 further will progressively tighten the joint interface 16 until a suitable tightness is achieved, at which time the fastener 72 and, if applicable the fastener in the post 66, may then be tightened to fix the body 22 relative to its corresponding mounting unit via fastener 72 and to the post 66 and thus the mounting unit 40 on the adjacent fixture segment 14, thus completing the joint interface 16. Thus, in some exemplary embodiments, the coupling may be deployed with a rotation of a drive tool through an angle of rotation of 90 degrees or less, for example between about 25 and about 75 degrees, thereby allowing the coupling function to be completed in some cases in one or two rotations of a drive tool, a first rotation to snug up the coupling and the second to tighten the coupling.

While exemplary embodiments of a coupler are disclosed herein with reference to light fixtures and/or light fixture housings, such couplings may be used in other coupling interfaces, such as other ceiling or wall mounted decorative units or the like.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A light fixture coupler for releasably joining at least a first segment and a second segment at a joint interface therebetween, the light fixture coupler comprising a body to be rotatably retained on one of the first and second segments, the body configured to rotate about a central axis between a release position and a coupling position, the body having a designated receiving location to receive a complementary coupling element on the other of the first and second segments, and a pathway defined on the body and extending from the designated receiving location, wherein the designated receiving location and the pathway are configured to permit the complementary coupling element to travel along the pathway as the body rotates toward the coupling position, and thereby to laterally transfer the one segment toward the other segment to form the joint interface when the body reaches the coupling position with the complementary coupling element engaged within the pathway.

2. The light fixture coupler of claim 1, wherein the designated receiving location includes an opening formed in the body.

3. The light fixture coupler of claim 2, wherein the pathway is a slot extending from the opening.

4. The light fixture coupler of claim 3, wherein the opening is at a first radial distance from a central axis and the slot includes a terminus positioned at a second radial distance from the central axis, wherein the first distance is greater than the second distance, so that when the body is rotated about the central axis the complementary coupling element is drawn toward the central axis.

5. The light fixture coupler of claim 3, wherein the body has a central hub portion with a central passage extending therethrough, the hub portion having a drive tool engaging structure.

6. The light fixture coupler of claim 5, wherein the central passage in the drive tool engaging structure is configured at a first end to form a drive tool receiving cavity.

7. The light fixture coupler of claim 6, wherein the central passage is configured at a second end to receive a threaded fastener to rotatably mount the hub portion to the one segment.

8. The light fixture coupler of claim 5, further comprising a web portion extending radially outwardly from and at least partially extending around the hub portion, the web portion having a peripheral region with a discontinuity formed therein to define the opening.

9. The light fixture coupler of claim 8, wherein the web portion is disc-shaped with an enlarged outer rim and a pair of opposite surfaces, and the pathway extends from the opening and is open to both opposite surfaces to form the slot in the web portion.

10. The light fixture coupler of claim 1, wherein the pathway includes a plurality of serrations along at least one boundary thereof to engage the complementary coupling element to cause a progressively indexing effect between the body and the complementary coupling element as the complementary coupling element progresses along the at least one boundary during travel along the pathway.

11. A kit comprising the light fixture coupler of claim 1 at least in part.

12. A light fixture segment comprising the light fixture coupler of claim 1.

13. A method of assembling together a light fixture including connecting at least a first segment with a second segment at a joint interface using the light fixture coupler of claim 1, comprising:
   providing a first segment and a second segment;
   rotatably retaining the body on one of the first and second segments;
   providing a complementary coupling element on the other of the first and second segments;
   positioning the complementary coupling element adjacent the receiving location in the release position; and
   rotating the body from the release position to the coupling position, with the complementary coupling element displaced along the pathway.

* * * * *